United States Patent
Lemberg et al.

(10) Patent No.: US 10,552,264 B2
(45) Date of Patent: Feb. 4, 2020

(54) HIDDEN DIAGNOSTIC PARTITION

(71) Applicant: Western Digital Technologies, Inc., San Jose, CA (US)

(72) Inventors: Alexander Lemberg, Kfar Saba (IL); Rotem Sela, Haifa (IL)

(73) Assignee: Western Digital Technologies, Inc., San Jose, CA (US)

( * ) Notice: Subject to any disclaimer, the term of this patent is extended or adjusted under 35 U.S.C. 154(b) by 111 days.

(21) Appl. No.: 15/717,494

(22) Filed: Sep. 27, 2017

(65) Prior Publication Data

US 2019/0095271 A1 Mar. 28, 2019

(51) Int. Cl.
 *G06F 11/14* (2006.01)
(52) U.S. Cl.
 CPC ................. *G06F 11/1441* (2013.01)
(58) Field of Classification Search
 CPC .. G06F 9/4406; G06F 9/4411; G06F 11/1417; G06F 11/1438; G06F 11/1441
 USPC ...................... 713/1, 2; 714/14, 22
 See application file for complete search history.

(56) References Cited

U.S. PATENT DOCUMENTS

| | | | |
|---|---|---|---|
| 6,631,086 B1 | 10/2003 | Bill et al. | |
| 6,711,660 B1 * | 3/2004 | Milne | G06F 9/4406 711/173 |
| 6,807,643 B2 | 10/2004 | Eckardt et al. | |
| 7,366,888 B2 * | 4/2008 | Dayan | G06F 9/4406 713/2 |
| 2004/0049724 A1 | 3/2004 | Bill et al. | |
| 2008/0168299 A1 * | 7/2008 | Kateley | G06F 11/1417 714/2 |
| 2010/0332813 A1 | 12/2010 | Rothman et al. | |
| 2011/0161551 A1 | 6/2011 | Khosravi et al. | |
| 2016/0232057 A1 * | 8/2016 | Star | G06F 11/1417 |

* cited by examiner

*Primary Examiner* — Joseph R Kudirka
(74) *Attorney, Agent, or Firm* — Brinks Gilson & Lione (57) ABSTRACT

A storage device with a memory may have a hidden diagnostic partition that can only be accessed during debug or diagnostic mode. Debug or diagnostic mode allows a host device to access the debug or diagnostic analysis (e.g. error logs) stored in the hidden diagnostic partition. By default, the hidden diagnostic partition is invisible to the host. When accessed through a triggering event, such as a vendor specific command ("VSC"), the hidden diagnostic partition can be used to report debug and error events.

20 Claims, 8 Drawing Sheets

HIDDEN DIAGNOSTIC PARTITION

TECHNICAL FIELD

This application relates generally to memory devices. More specifically, this application relates to providing diagnostic capabilities in non-volatile semiconductor flash memory with a diagnostic partition that is hidden from the host except during a debug or diagnostic mode.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Debugging and diagnostics may be run on the device for identifying errors. The diagnostic capabilities based on standard read and write commands may be limited as standard read and write commands may be encrypted by a host sub-system. This encrypted communication may prevent an application on the host side from communicating with the device. The host or an application on the host may need to either access the diagnostic information or to perform debug or diagnostic procedures for the device. It may be problematic to require specific signatures for a write command to signal to the device controller that it is not a standard write command but a special diagnostic command requesting an error log. Multiple layers of encryption (e.g. in mobile device operating systems) may prevent the sending of diagnostic commands to a storage device.

SUMMARY

A storage device with a memory may have a hidden diagnostic partition that can only be accessed during debug or diagnostic mode. Debug or diagnostic mode allows a host device to access the debug or diagnostic analysis (e.g. error logs) stored in the hidden diagnostic partition. By default, the hidden diagnostic partition is invisible to the host. When accessed through a triggering event, such as a vendor specific command ("VSC"), the hidden diagnostic partition can be used to report debug and error events.

DESCRIPTION OF THE EMBODIMENTS

In various computing environments including a storage device or memory system, debugging or diagnostics may be necessary for identifying and fixing past or future errors. The diagnostic analysis must be restricted to avoid problems from accidentally triggering diagnostic functions which may cause fatal errors or problems with the device. Encryption can be used on standard read and write commands which may restrict access to the diagnostic functions and by that prevent the host from performing adequate and timely diagnostics. The memory of the storage device may include a hidden partition with the diagnostic functions. The hidden partition may be invisible during normal/default operations and may only be accessed when in diagnostic mode. Diagnostic mode may be triggered through a vendor specific command ("VSC"), a sequence of commands, or through a physical pin in the device. The pin may be referred to as a vendor specific function ("VSF") pin that is used for switching modes. By using a hidden partition for the debugging or diagnostic operations, standard read/write commands may be used for encapsulating the diagnostic protocol. The diagnostic protocols used for accessing diagnostic information and performing diagnostic functions would be standard read and write commands that would not necessarily be encrypted.

The embodiments described below include a computing system (host and storage device, which may be collectively referred to as a memory system) that includes a diagnostic mode operation for accessing a hidden diagnostic partition. In the storage device memory is the hidden diagnostic partition that may be stored in an area of the memory that is not logically addressed. Upon receipt of a triggering mechanism (e.g. VSC), the diagnostic mode may be activated allowing for standard read/write access to the hidden diagnostic partition. In addition to processing commands for the hidden diagnostic partition, regular commands may still be processed in parallel for accessing the regular partitions.

Figure 1A:
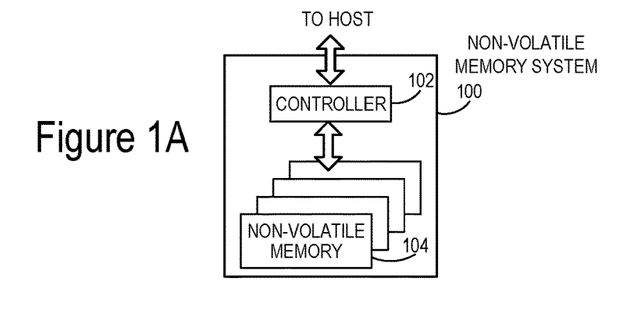
FIG. 1A is a block diagram of an example non-volatile memory system.

FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol, eMMC, UFS or PCIe/NVMe.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
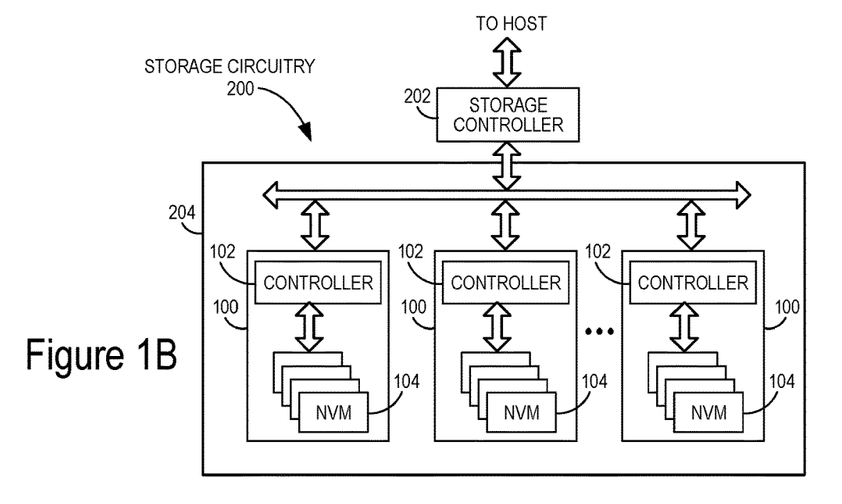
FIG. 1B is a block diagram of a storage module that includes a plurality of non-volatile memory systems.

FIG. 1B illustrates storage circuitry 200 that includes plural non-volatile memory systems 100 and may also be referred to as a storage module 200. As such, storage circuitry 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage circuitry 200, in one embodiment, may be a solid state drive (SSD), such as found in portable computing devices, such as laptop computers, and tablet computers.

Figure 1C:
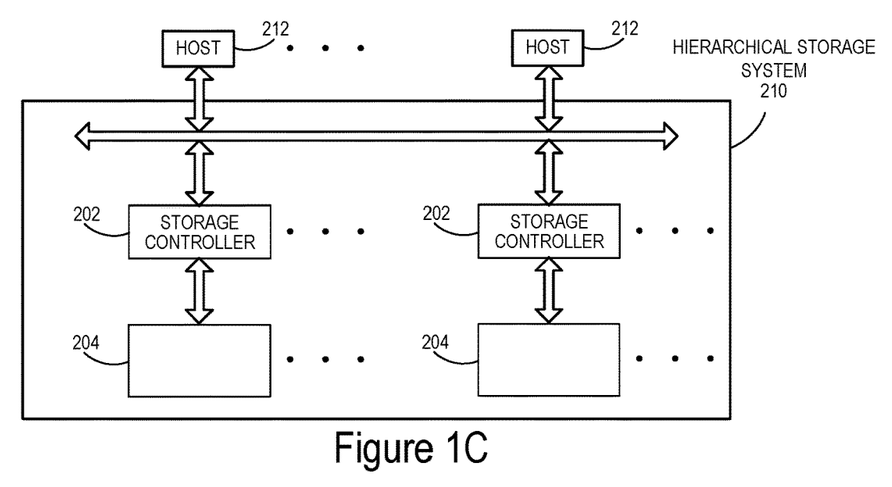
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
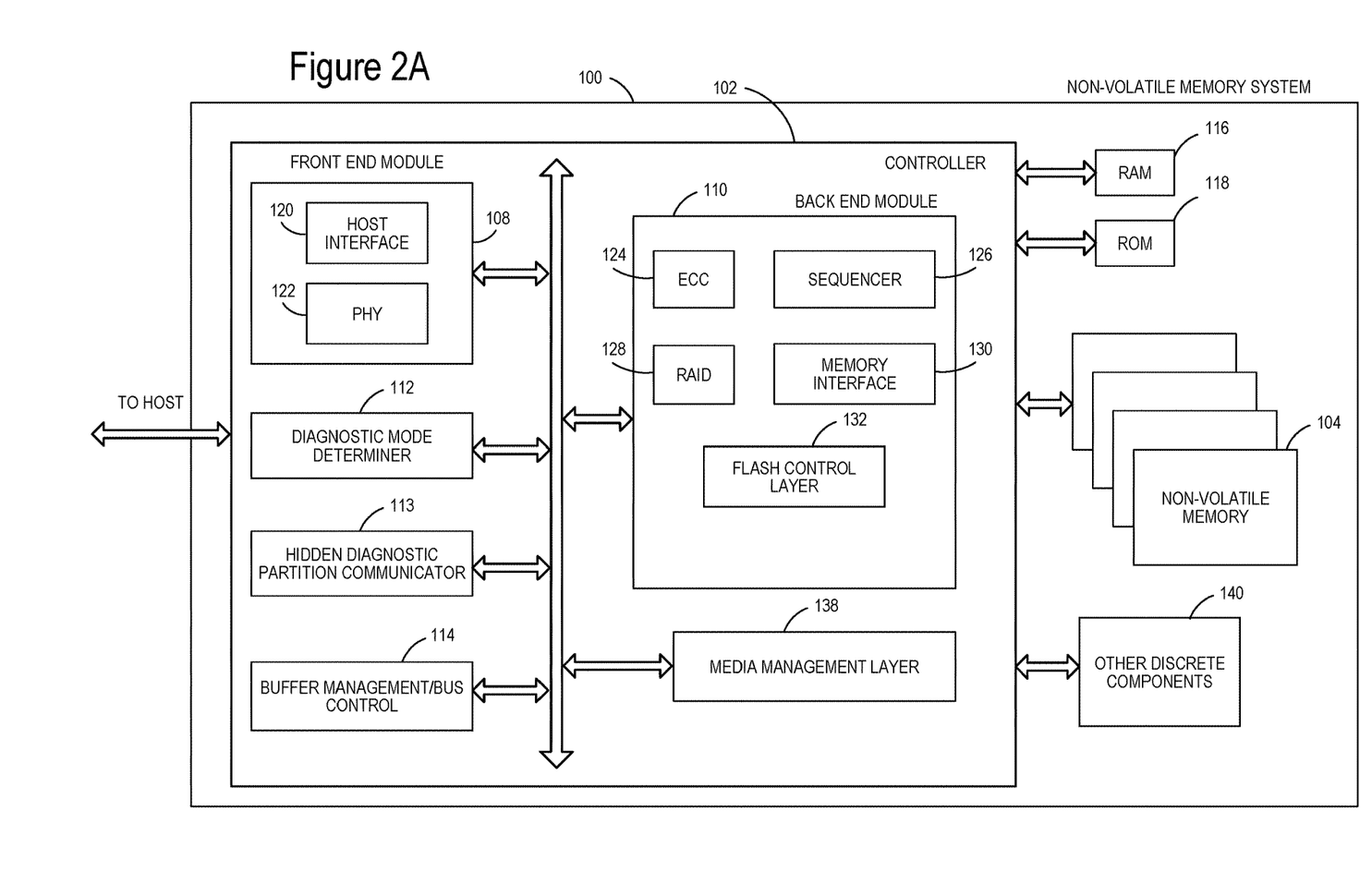
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of circuitry or a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

Exemplary modules or circuitry of the controller 102 may include a diagnostic mode determiner 112 and a hidden diagnostic partition communicator 113. As explained in more detail below in conjunction with FIGS. 3-8, the diagnostic mode determiner 112 may determine when to enter into diagnostic mode with the memory system 100 and the host (e.g. the host cannot operate the operating system stored by the memory 104). The diagnostic mode determiner 112 may detect an event or error that triggers debugging or diagnostic mode. Alternatively, the host may provide a command (e.g. VSC) to initiate the diagnostic mode. As described below, the diagnostic partition is hidden in the non-volatile memory 104 and only accessible during diagnostic mode. Communications with the hidden diagnostic partition during diagnostic mode may be through a hidden diagnostic partition communicator 113 that allows access to the hidden diagnostic partition during diagnostic mode. The hidden partition may be stored in an area of the memory 104 that is not logically addressed and is hidden during normal operation.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die. In one embodiment, the ROM 118 may include firmware that provides the location for the hidden diagnostic partition for the diagnostic mode determiner 112.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

Figure 2B:
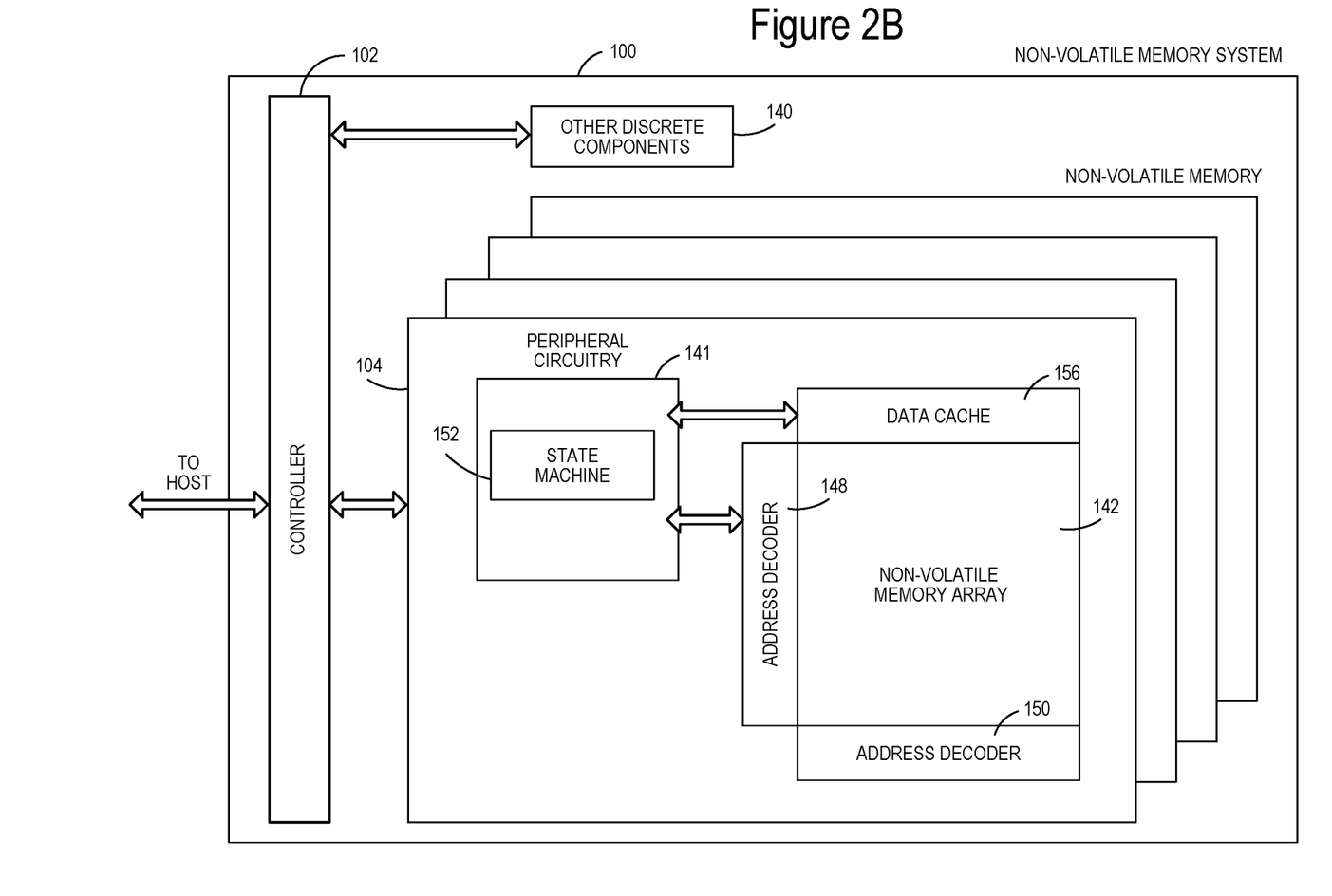
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
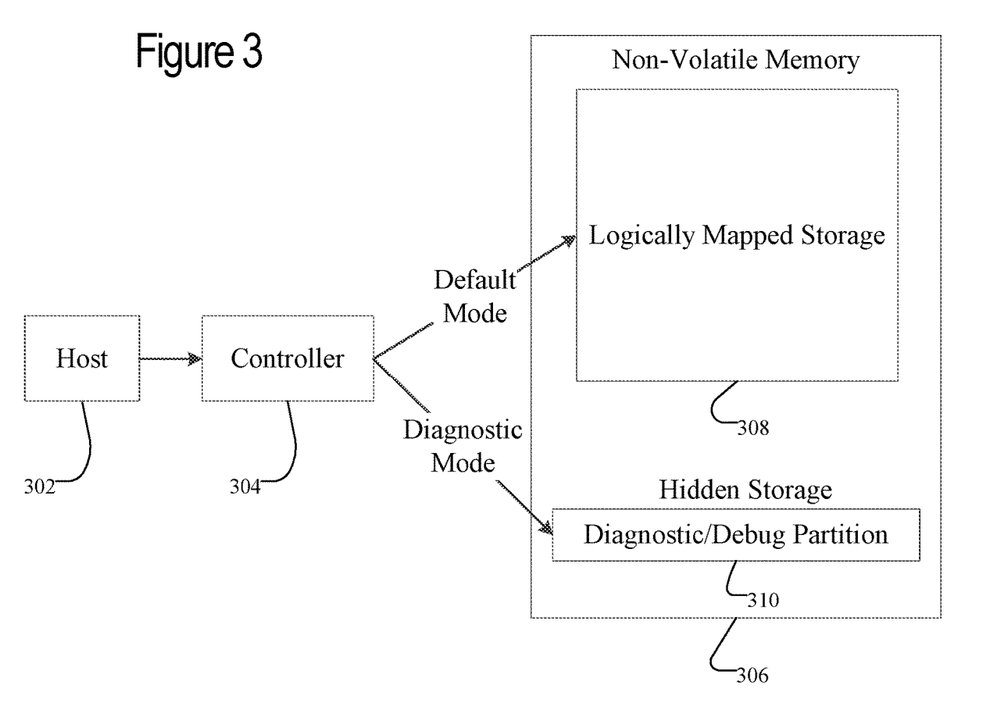
FIG. 3 is a block diagram of an exemplary memory system with a hidden diagnostic partition.

FIG. 3 is a block diagram of an exemplary memory system with a hidden diagnostic partition. The host 302, controller 304 and the non-volatile memory (NVM) 312 are shown separately in FIG. 3, but in alternative embodiments they may be part of a single system (e.g. system on a chip SoC) in which the operating system for the host 302 is stored in the NVM 306. The NVM 306 includes logically mapped storage 308 which stores data that is written to and read from with standard read/write commands during normal operations (i.e. default mode). The logical mapping of the memory may include logical block addresses (LBAs). However, a hidden diagnostic partition 310 of the NVM 306 is not logically mapped so that it is not accidentally accessed. Accordingly, the controller 304 provides the physical location in the NVM 306 for the hidden diagnostic partition 310 when in diagnostic mode for receiving diagnostic commands from the host 302 and providing diagnostic information/results to the host 302. The hidden partition 310 may be referred to as the hidden diagnostic partition and be not being logically mapped, it is invisible to the host during normal operation.

The host 302 communicates with the controller 304 for accessing data stored in the NVM 306. Although not shown, the host communications with the controller can specify whether the commands are for the default mode or are for the diagnostic mode. In other words, the host can issue diagnostic commands or receive debug/diagnostic information from the NVM 306 during diagnostic mode. During default mode, the commands and communications with the NVM 306 are only with the logically mapped storage 308.

During the diagnostic mode, the hidden storage partition is visible and can be accessed. This hidden storage partition is specifically for debugging and diagnostic commands or information. By storing the diagnostic partition in a location that is not logically mapped, it is less likely to be accidentally run and accessed. The data integrity may be improved by any of the following: 1) further encrypting the hidden diagnostic partition; 2) keeping the hidden diagnostic partition in high-endurance memory region (e.g. in single level cells (SLC) blocks in flash); 3) keeping redundant copies; and/or 4) handling any data retention occurrences. The location storing the hidden diagnostic partition may be characterized by low write and read cycles.

When the diagnostic-mode is triggered, storage-device firmware may enter a special mode of operation referred to as debug or diagnostic mode. In this mode, the firmware may perform limited operations related to diagnostics. Operations that may be performed include: 1) fetching the location of the hidden diagnostic partition in the non-volatile memory; 2) upon a host read of the hidden diagnostic partition logical area, sectors from this location may be read; 3) transferring diagnostic data to host; and 4) performing diagnostic analysis. In one embodiment, the device may still serve regular (unrelated to diagnostics) commands from the host while in the debug/diagnostic mode. The regular commands will be processed differently (accessing the standard partition/NVM) whereas the diagnostic commands access the hidden diagnostic partition.

Figure 4:
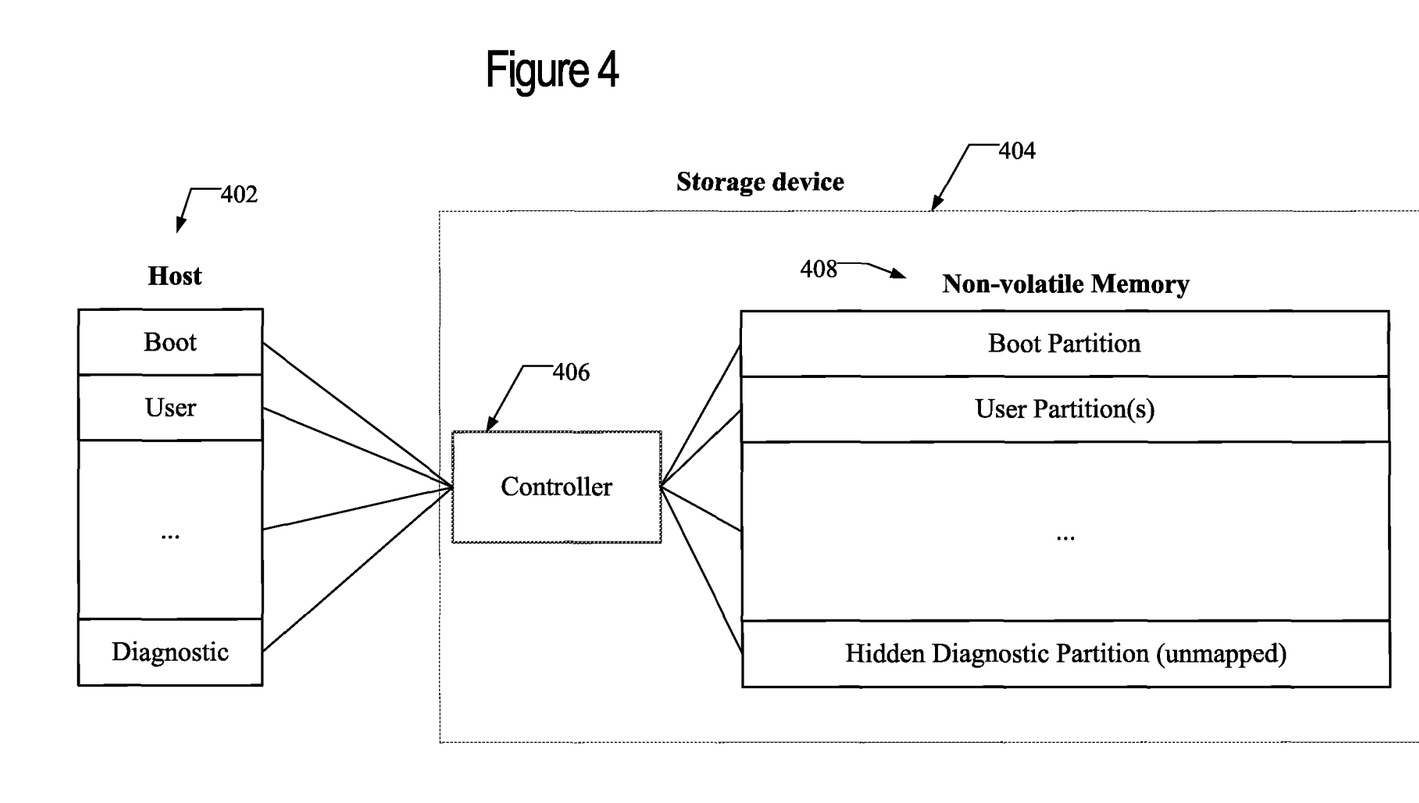
FIG. 4 is a block diagram of another exemplary memory system with multiple partitions including a hidden diagnostic partition.

FIG. 4 is a block diagram of another exemplary memory system with multiple partitions including a hidden diagnostic partition. The host 402 is illustrated with different processes to be performed such as the boot process, various user processes, and the diagnostic process. Those processes may be communicated with the storage device 404 through the controller 406. Each process may correspond with a specific partition of the non-volatile memory 408. For example, there may be a separate boot partition and user partitions. The boot partition and the user partitions are logically mapped for reading/writing by the host. The non-volatile memory 408 may also include a diagnostic partition. The diagnostic partition may be hidden by being not logically mapped, which hides the diagnostic functions/data from the host since it can only access the logically mapped partitions during normal or default mode of operation. As described below, when entering the diagnostic mode, the hidden diagnostic portion of the non-volatile memory 408 becomes accessible to the host 402 for performing diagnostic functions and for providing diagnostic data.

Figure 5:
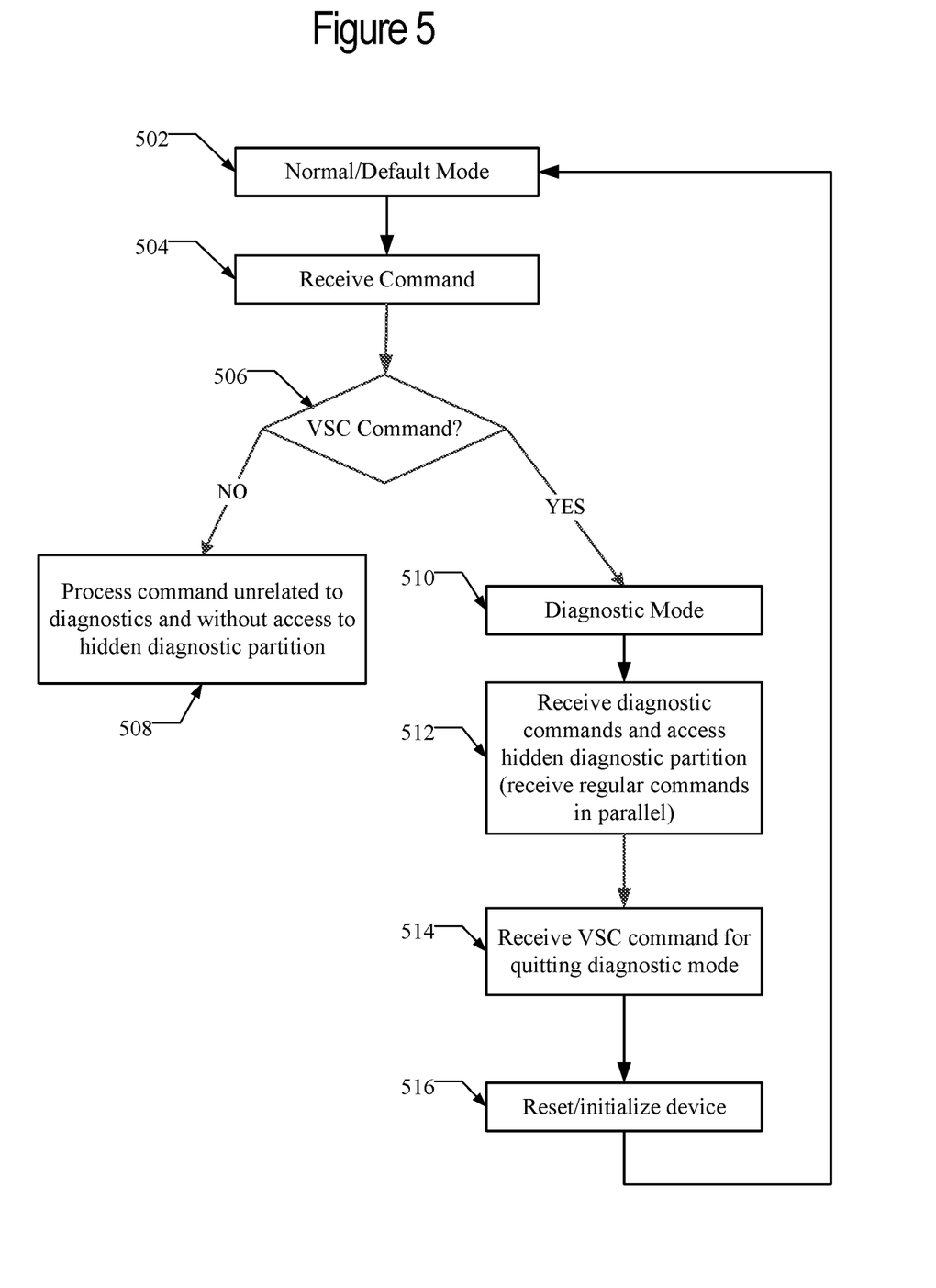
FIG. 5 is a flow diagram of normal and diagnostic mode commands.

FIG. 5 is a flow diagram of normal and diagnostic mode commands. A normal or default mode of operation in block 502 is for standard read/write commands between a host and the storage device. The device can receive a command in block 504. The received command is processed and assuming that it is not a trigger (e.g. a VSC command) in block 506, the storage device processes the received command in block 508. The processing of the command is unrelated to diagnostics and the host does not have access to the hidden diagnostic partition.

If the received command 504 includes a diagnostic mode trigger such as a VSC command in block 506, then the storage device enters diagnostic mode in block 510. The diagnostic mode may also be referred to as a debug or debugging mode or recovery mode. Exemplary debugging or diagnostic processes that may be performed when in diagnostic mode include: 1) reading different host or device (firmware) logs; 2) testing the OS image for file corruptions by reading the entire media; 3) sending diagnostic commands to device; 4) performing host based firmware download or field-firmware-upgrade; and/or 5) operating tools such as a memory analysis tool.

In diagnostic mode 510, diagnostic commands may be received and access to the hidden diagnostic partition are provided in block 512. In one embodiment, the device can continue to receive regular (non-diagnostic) commands in parallel with the diagnostic commands. The diagnostic commands access the hidden diagnostic partition, while the regular commands access standard user partitions of the memory. The command received from the host may be a trigger (e.g. VSC command) for leaving diagnostic mode and entering the normal/default mode in block 514. Accordingly, upon reset or initialization of the storage device in block 516, the device may return to the normal or default mode in block 502 in which the hidden diagnostic partition cannot be accessed. Resetting may include a power cycle or a physical reset pin that is activated.

Figure 6:
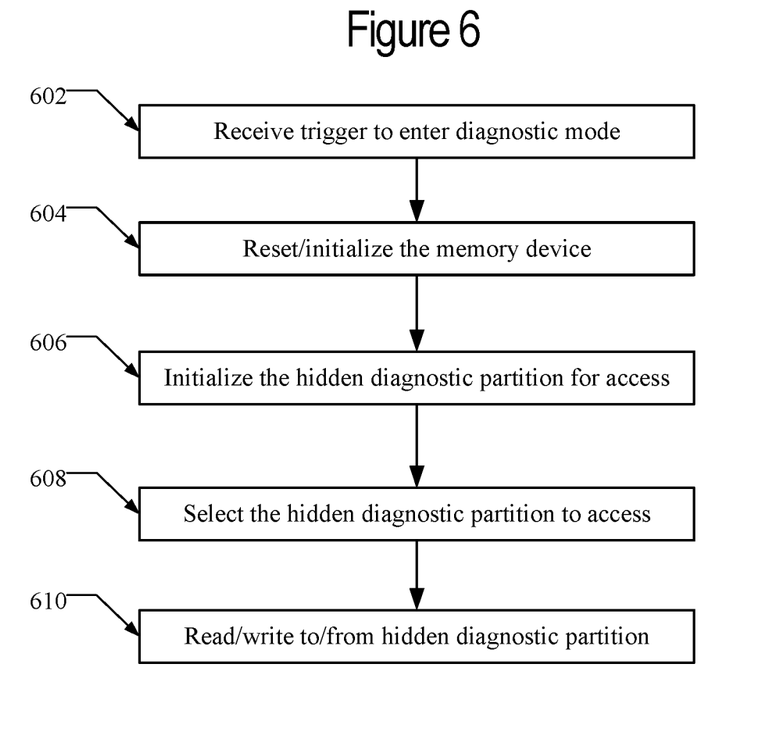
FIG. 6 is a flow diagram of diagnostic mode entry.

FIG. 6 is a flow diagram of diagnostic mode entry. In one embodiment, the entry into diagnostic mode may be based on receipt of or identification of a trigger as in block 602. The trigger may be a special command from the host that triggers the diagnostic mode. The special command could be any unambiguous signal that cannot be issued by mistake. Accordingly, the special command may be a vendor specific command ("VSC"). In alternative embodiments, the trigger may be a special sequence that is sent to a peripheral communication channel (e.g. a universal asynchronous receiver/transmitter (UART), Joint Test Action Group (JTAG), etc.). For example, in the case of eMMC devices, the VSC CMD64 may be defined as a CMD64 command and a 32 bit unique pattern (e.g. 0xB0B0B0B0). The trigger may include a general-purpose input/output (GPIO) sequence.

After receipt of the trigger in block 602, a reset or initialization of the device may be required for leaving normal mode and entering diagnostic mode in block 604. The hidden diagnostic partition may then be initialized for access by the host in block 606. The hidden diagnostic partition may need to be selected for the host access in block 608. The host can then read and write to and from the hidden diagnostic partition for diagnostic functions. As discussed above, diagnostic mode may include instructions from the host for the storage device to perform diagnostic functions or may include the reading of diagnostic data from the hidden diagnostic partition. The regular user partition can continue to be accessed in parallel even while in diagnostic mode.

Figure 7:
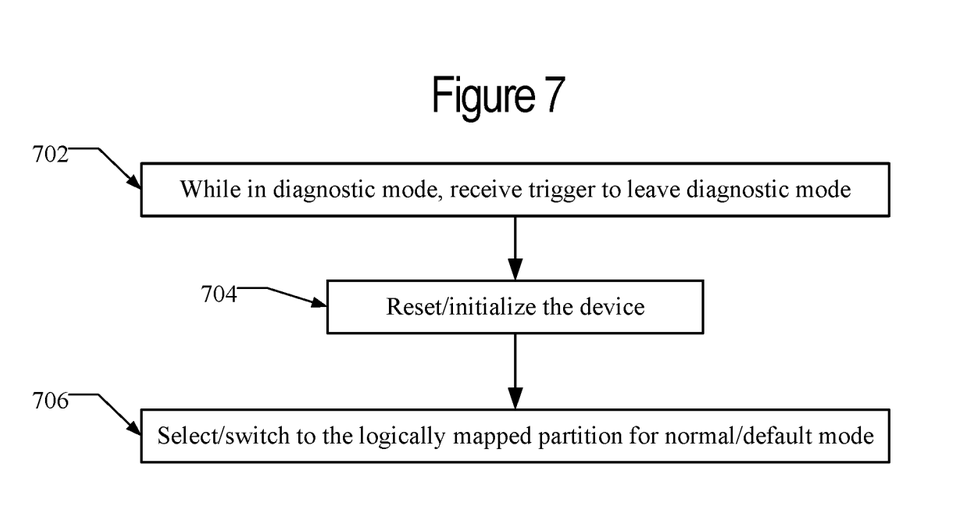
FIG. 7 is a flow diagram of diagnostic mode exit.

FIG. 7 is a flow diagram of diagnostic mode exit. A storage device in diagnostic mode may return to normal or default mode operations in a similar way to entry of the diagnostic mode. There may be a trigger that is provided to the storage device in block 702. The trigger for returning to normal mode from diagnostic mode may be the same as the trigger for entering the diagnostic mode from the normal mode. For example, there may be a VSC that is used as the trigger. After the trigger, a reset or initialization of the device in block 704 may be required for completing the changing from the diagnostic mode to the normal mode. Rather than the hidden diagnostic partition for the diagnostic mode, the return to the normal mode includes the selection or switching to a logically mapped partition in block 706 for regular read/write commands.

Figure 8:
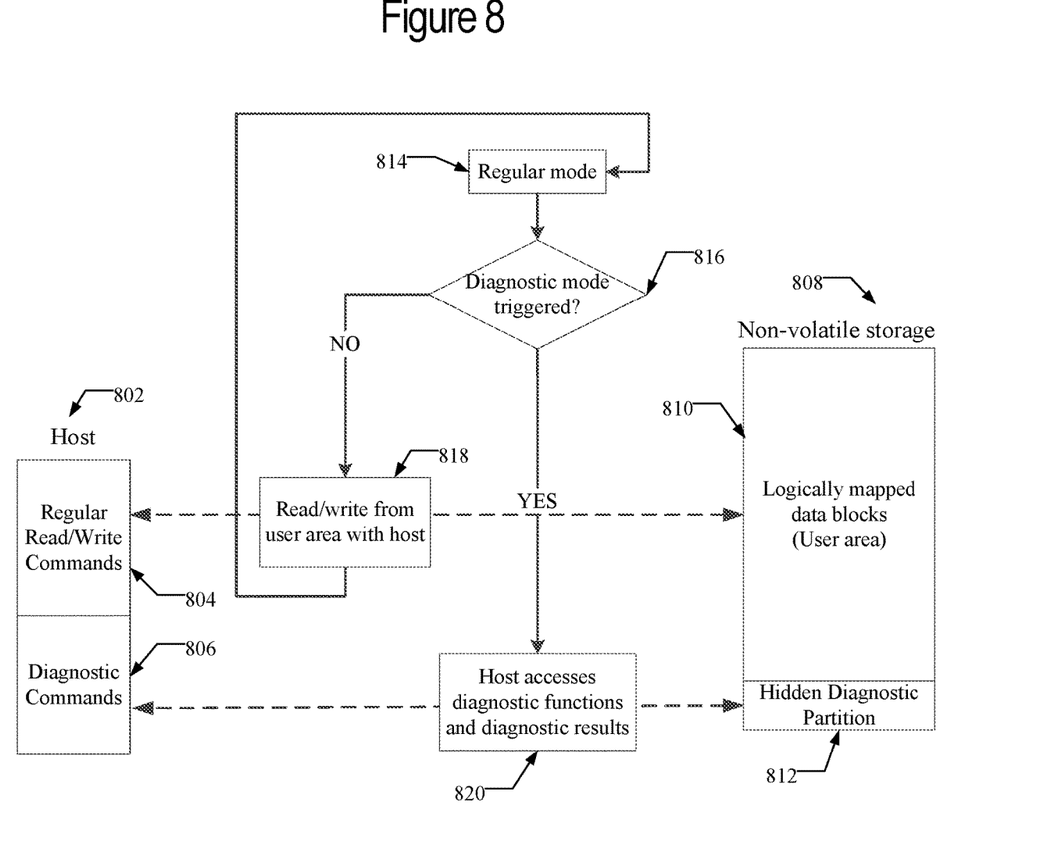
FIG. 8 is a block diagram with a flow for reading and writing to memory.

FIG. 8 is a block diagram with a flow for reading and writing to memory. The host 802 includes multiple commands for different modes of operation. For the normal or default mode, the host 802 utilizes regular read/write commands 804. For the diagnostic mode, the host 802 utilizes diagnostic commands 806. The commands are for communicating with the non-volatile storage 808. The non-volatile storage 808 may include logically mapped data blocks 810 (e.g. a user area) and a hidden diagnostic partition 812.

When in regular mode 814, commands are analyzed to determine whether the diagnostic mode is triggered 816. When the diagnostic mode is not triggered and the storage device remains in regular mode, the host 802 issues regular read/write commands 804 to the logically mapped data blocks 810 of the non-volatile storage 808 as in block 818. Conversely, when the diagnostic mode is triggered in 816, the host 802 issues diagnostic commands 806 to the hidden diagnostic partition 812 of the non-volatile storage 808. Specifically, in block 820, the diagnostic commands 806 access diagnostic functions of the storage device and access diagnostic results from the storage device.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A method for performing diagnostics for a memory device, the method comprising:
   receiving a trigger command for entering a diagnostic mode;
   in response to receiving the trigger command, entering the diagnostic mode; and
   while in the diagnostic mode:
      receiving and processing a diagnostic command from a host to provide access to a hidden diagnostic partition within the memory device; and
      receiving and processing a non-diagnostic command from the host to provide access to a non-hidden partition within the memory device, wherein the non-diagnostic command is received and processed even though the memory device is in the diagnostic mode;
   wherein the diagnostic command and the non-diagnostic command are processed in parallel.

2. The method of claim 1, wherein the trigger command comprises a vendor specific command ("VSC").

3. The method of claim 2, wherein the VSC is provided by the host during a normal mode of operation for triggering the diagnostic mode.

4. The method of claim 1, wherein entering the diagnostic mode further comprises:
   resetting or initializing the memory device through a power cycle.

5. The method of claim 1, wherein the hidden diagnostic partition is hidden by being not logically mapped such that the hidden diagnostic partition cannot be accessed with standard read/write commands in a normal mode of operation.

6. The method of claim 5, wherein the memory device comprises one or more partitions that are logically mapped and accessible with the standard read/write commands.

7. The method of claim 5, further comprising:
   receiving another trigger command for leaving the diagnostic mode and returning to the normal mode of operation; and
   resetting or initializing the memory device to enter the normal mode of operation following the resetting or initializing.

8. The method of claim 1, wherein the memory device comprises flash memory.

9. The method of claim 8, wherein the flash memory comprises a three-dimensional (3D) memory configuration.

10. A storage device comprising:
    a non-volatile memory comprising:
       logically mapped storage; and
       an un-mapped storage, wherein the un-mapped storage comprises a hidden diagnostic partition; and a controller configured to trigger a diagnostic mode of operation upon receipt of a trigger command and to perform the following while in the diagnostic mode:
receive and process a diagnostic command from a host device to provide access to the hidden diagnostic partition; and
receive and process a non-diagnostic command from the host device to provide access to the logically-mapped storage, wherein the non-diagnostic command is received and processed even though the storage device is in the diagnostic mode;
wherein the diagnostic command and the non-diagnostic command are processed in parallel.

11. The storage device of claim 10, wherein the trigger command is from the host device.

12. The storage device of claim 11, wherein the host device cannot access the un-mapped storage during a regular mode of operation.

13. The storage device of claim 12, wherein the controller is further configured to provide the host device access to the hidden diagnostic partition during the diagnostic mode of operation.

14. The storage device of claim 12, wherein the controller is further configured to:
receive read/write commands from the host device for data stored in the logically mapped storage during the regular mode of operation; and
receive diagnostic commands from the host device for data stored in the un-mapped storage during the diagnostic mode of operation.

15. The storage device of claim 12, further comprising:
a diagnostic mode determiner configured to:
receive the trigger command; and
switch from the regular mode of operation to the diagnostic mode of operation; and
a hidden diagnostic partition communicator configured to access the hidden diagnostic partition in the un-mapped storage during the diagnostic mode of operation.

16. The storage device of claim 15, wherein the diagnostic mode determiner and the hidden diagnostic partition communicator are part of the controller.

17. The storage device of claim 10, wherein the diagnostic mode of operation enables performance of diagnostic functions and accessing of diagnostic data.

18. The storage device of claim 10, wherein the trigger command comprises a vendor specific command.

19. A memory system with diagnostics, the memory system comprising:
a hidden diagnostic partition;
a non-hidden partition;
means for receiving a trigger command for entering a diagnostic mode; and
means for, while in the diagnostic mode:
receiving and processing a diagnostic command from a host to provide access to the hidden diagnostic partition; and
receiving and processing a non-diagnostic command from the host to provide access to the non-hidden partition, wherein the non-diagnostic command is received and processed even though the memory device is in the diagnostic mode;
wherein the diagnostic command and the non-diagnostic command are processed in parallel.

20. The memory system of claim 19, further comprising means for performing diagnostics based on communications with the hidden diagnostic partition, wherein the diagnostics comprise:
debugging and diagnostic functions performed on the memory system; and
communicating data regarding the debugging and diagnostic functions.

* * * * *